Patented June 9, 1942

2,285,950

UNITED STATES PATENT OFFICE 2,285,950

METHOD OF APPLYING INSECTICIDES

William N. Sullivan, Washington, D. C., and Lyle D. Goodhue, Berwyn, Md.; dedicated to the free use of the People in the Territory of the United States No Drawing. Application January 10, 1940, Serial No. 313,218

1 Claim. (Cl. 21—58)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

We hereby dedicate the invention herein described to the free use of the People in the territory of the United States to take effect on the granting of a patent to us.

This invention relates to improvements in the methods of applying materials for destroying or checking the growth or multiplication of living organisms, whether plant or animal, which are economically injurious to man.

Our invention relates to a method for the application of rotenone, the resins containing rotenone, related compounds, and the resins substantially free from rotenone that are obtained from rotenone bearing plants. This group will hereafter be termed rotenone insecticides. Our new method employs heat in order to obtain a very finely divided suspension of the rotenone insecticide in the air resembling smoke which can be used as a fumigant in the usual manner for the destruction of insects. The rotenone insecticides are first dissolved in a suitable solvent and the liquid is sprayed on a hot surface with the consequent production of a dense smoke or fog which contains the insecticidal material.

This method of dispersion has been known and used for volatile materials, such as nicotine, naphthalene, p-dichlorobenzene and others, but for solids which have practically no vapor pressure at room temperature this method is new and novel. The use of this method of dispersion for the dispersion in air of easily decomposed compounds is extraordinary. It is remarkable that rotenone and its related compounds can be sprayed in solution on hot surfaces without decomposition and complete loss of their insecticidal value. In fact, the small amounts required to fumigate a room leads us to believe that very little is destroyed.

This method of application has many advantages over other methods. The first and most important advantage is the stability of the fog or smoke containing rotenone insecticide. If a solution of the insecticide in the proper solvent is sprayed under favorable conditions it will remain in suspension in the air for only a few minutes. By this new method of dispersion the insecticide will remain suspended for several hours thereby increasing its efficiency tremendously. It has the further advantage that it is not readily adsorbed on surfaces, such as walls and floors, because it is in the nature of a smoke which is known to be much less readily absorbed than gases or vapors. Another advantage is its high efficiency with respect to the amount of material used and the amount of solvent required. The amount of solvent for the dispersion of the insecticide by this means is much less than that required for spraying. The amount of insecticidal material is also less.

Still another important advantage lies in the uses to which this dispersed material can be put. Since the solvent can be reduced far below that required to disperse by spraying and the amount of active material itself can be reduced it can be used in buildings and vehicles of transportation with much less discomfort or danger to health of the occupants.

In the preparation of these solutions of rotenone insecticides a number of solvents have been used. Among these are acetone, alcohol, tetrahydronaphthalene, amyl acetate, kerosene, dibutyl phthalate, anisole and safrole. In general the high boiling solvents containing the insecticides give the best dispersion when sprayed on hot surfaces but acetone has given good results, even better than a higher boiling solvent like amyl acetate. Of the solvents thus far tested safrole gives the best results, but we do not in any way restrict ourselves to this solvent. The characteristics such as low inflammability; good solvent power for rotenone insecticides, and the property of giving good dispersion to the insecticide best qualify a solvent for carrying out our invention.

The method of preparing these solutions is to dissolve the required amount of insecticide in the solvent. The amount of material dissolved will depend somewhat on its solubility and can vary within wide limits. A solution containing anywhere from one to twenty percent can be used.

The method of dispersion has the advantage that it is a very simple one. A solution of rotenone or similar material is sprayed on a hot surface and the dispersed insecticide is distributed in the usual manner used for other fumigants. The temperature of the hot surface is not critical but must be within certain limits, hot enough to give good dispersion but not hot enough to cause carbonization. A temperature near 400° C. has been found satisfactory, but we do not restrict ourselves to this, since temperatures between 300° C. and 500° C. can be used. The temperature chosen will depend somewhat on the boiling point of the solvent, but must be high enough to disperse the active insecticide before decomposition occurs.

For one very resistant test insect the adult housefly *Musca domestica,* has been used. In a specific test only 0.2 gram of rotenone in 10 cc. of safrole sprayed on a hot surface at 400° C. in a 1100 cubic foot room killed 53 percent of the flies. Only 0.05 gram in 216 cubic feet gave 67 percent kill. All mortality results were obtained after a 72 hour observation period in which tested flies were fed in the usual manner. Considering the resistance of the housefly to insecticides, this is a very good kill with this material dispersed in this manner.

Our method of dispersing this insecticide may be employed in the fumigation of greenhouses, mushroom houses, dwelling houses, bars, grain elevators, railroad cars and coaches, aeroplanes, automobiles, and other enclosed spaces, where it is possible to use a fumigant for the destruction of insect pests. It may be used for the eradication of insects on fruits, vegetables, nursery stock, clothing and dry good, tobacco, stored grain, and many other materials which are attacked by insects.

Having thus described our invention, what we claim for Letters Patent is:

A method of dispersing rotenone, rotenone bearing resins, compounds related to rotenone and the resin from which the rotenone has been removed, which consists in depositing a solution of any of these insecticides onto a surface heated at a temperature between 300° C.–500° C., thereby releasing the insecticides in the form of a smoke.

WILLIAM N. SULLIVAN.
LYLE D. GOODHUE.